United States Patent [19]

Shieh

[11] Patent Number: 5,713,549
[45] Date of Patent: Feb. 3, 1998

[54] MONITOR SUPPORT DEVICE

[76] Inventor: En-Ru Shieh, P.O. Box 63-99, Taichung, Taiwan

[21] Appl. No.: 445,710

[22] Filed: May 22, 1995

[51] Int. Cl.⁶ .................................................. E04G 3/00
[52] U.S. Cl. .................................. 248/284.1; 248/292.12; 248/919
[58] Field of Search ...................... 248/284.1, 292.12, 248/919, 920, 183.4, 183.1

[56] References Cited

U.S. PATENT DOCUMENTS

| | | | |
|---|---|---|---|
| 362,399 | 10/1887 | Schlotterbeck | 248/292.12 |
| 1,615,563 | 1/1927 | Atwood et al. | 248/292.12 |
| 3,436,046 | 4/1969 | Valeska | 248/284.1 |
| 4,640,485 | 2/1987 | Day et al. | 248/183.4 X |
| 4,834,329 | 5/1989 | Delapp | 248/183.4 X |
| 5,123,621 | 6/1992 | Gates | 248/920 X |
| 5,170,975 | 12/1992 | Chadwick | 248/284.1 |

*Primary Examiner*—Philip C. Kannan

[57] ABSTRACT

A support device includes a base having two upward extending walls for rotatably supporting a lower end of a beam. The beam includes a number of teeth formed in the lower end for engaging with a worm which is rotatably supported on the base and includes the other end for supporting a monitor. The beam is rotated about the walls by the worm so as to move the monitor upward and downward. A bracket is pivotally coupled to the upper end of the beam for supporting the monitor. The base is rotatably supported on a clamping device for clamping onto a desk.

1 Claim, 3 Drawing Sheets

MONITOR SUPPORT DEVICE

BACKGROUND OF THE INVENTION

1. Field of the Invention

The present invention relates to a support device, and more particularly to a support device for supporting monitors and the like.

2. Description of the Prior Art

Typical monitors are directly disposed on the computer or on the computer desk. The monitors normally include a heavy weight such that the monitors may not be easily moved to suitable position.

The present invention has arisen to mitigate and/or obviate the afore-described disadvantages of the conventional monitors.

SUMMARY OF THE INVENTION

The primary objective of the present invention is to provide a support device for supporting a monitor thereon, in which the monitor may be easily moved and adjusted to suitable position.

In accordance with one aspect of the invention, there is provided a support device for supporting an object thereon. The support device comprises a base including a wall means extended upward therefrom, the wall means including a pivot axle, a worm rotatably supported on the base and including means for rotating the worm, and a beam including a first end pivotally coupled to the wall means at the pivot axle and including a plurality of teeth formed on the first end thereof for engaging with the worm, the beam including a second end for supporting the object thereon. The beam is rotated about the pivot axle by the worm so as to move the object upward and downward.

A bracket is pivotally coupled to the second end of the beam at a pivot shaft for supporting the object, and a lever includes a first end pivotally coupled to the wall means at a pivot pin and includes a second end pivotally coupled to the bracket at a pivot axis, the pivot pin is arranged below the pivot axle, and the pivot axis is arranged below the pivot shaft. The pivot axle, the pivot shaft, the pivot axis and the pivot pin form a parallelogram.

The base is engaged on a clamping means for clamping onto a desk and rotatably supported on and secured to the clamping means by a fastening means such that the base is rotatable about the fastening means.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
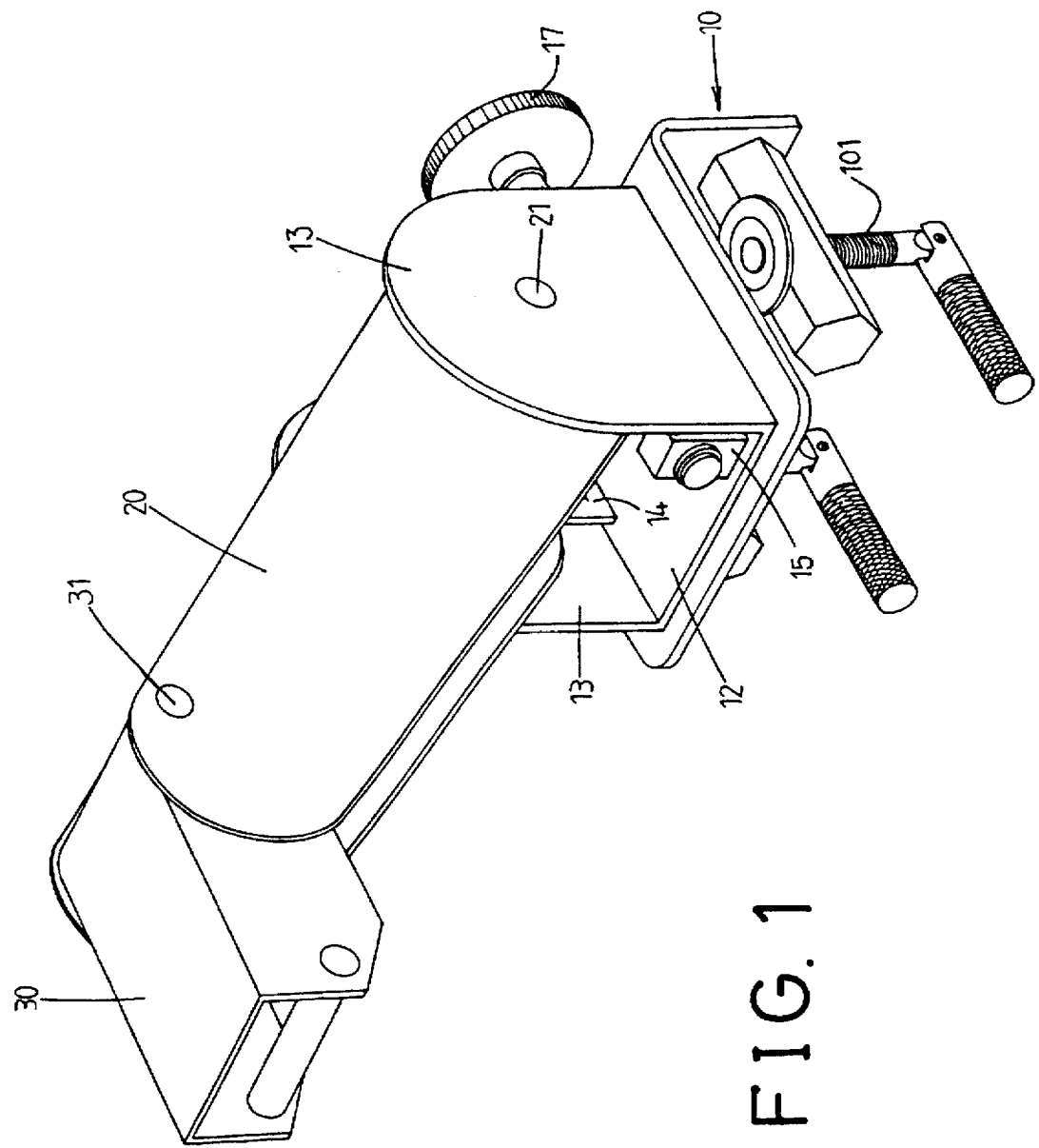
FIG. 1 is a perspective view of a monitor support device in accordance with the present invention.
Figure 2:
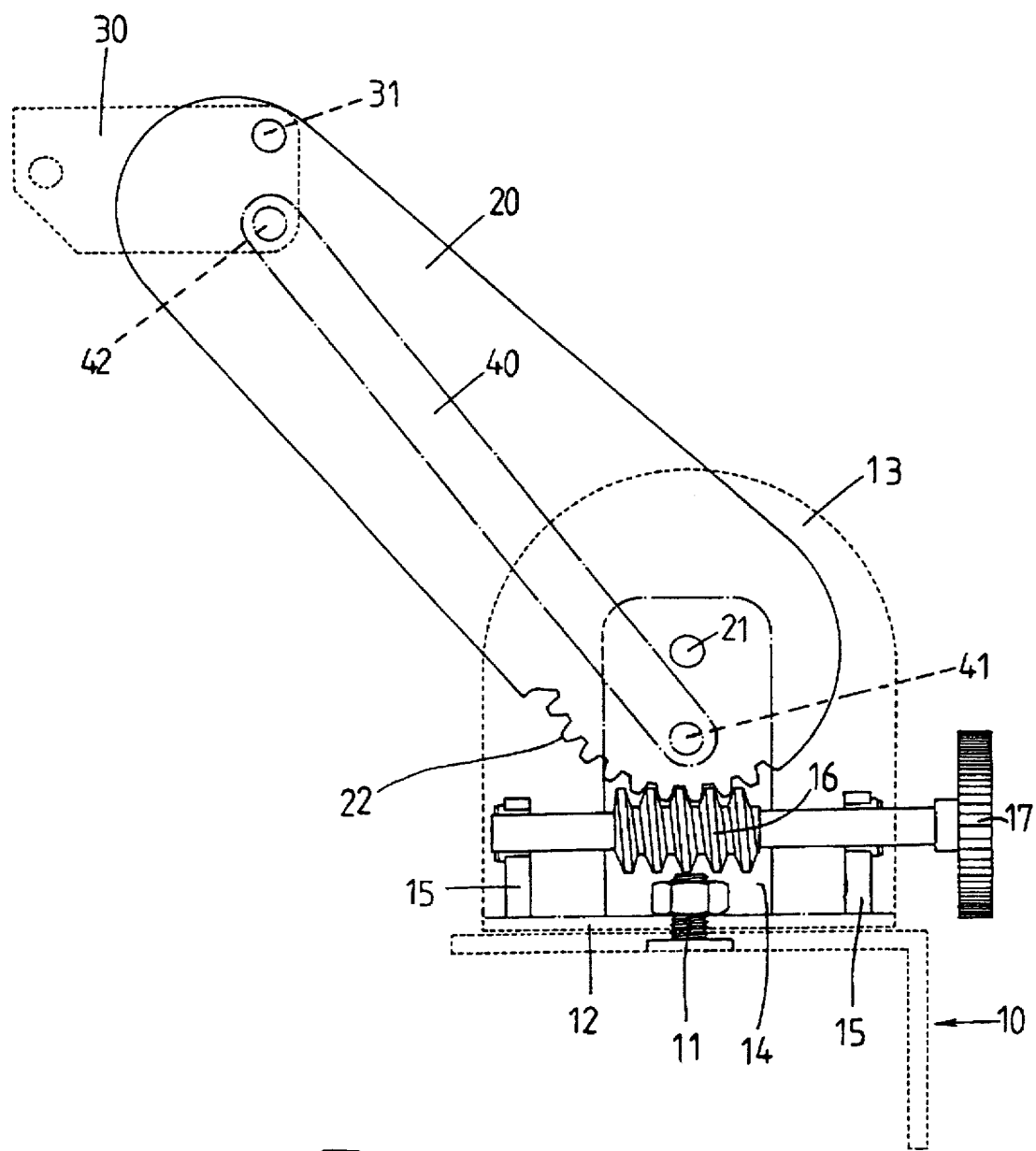
FIGS. 2 and 3 are schematic views illustrating the operation of the support device.

Referring to the drawings, and initially to FIGS. 1 and 2, a monitor support device in accordance with the present invention comprises a clamping mechanism 10 for clamping onto a support member, such as a desk, by fastening members 101. The clamping mechanism 10 may also be a clip means, and is not related to the present invention and will not be described in further details. A base 12 is disposed on the clamping mechanism and rotatably coupled to the clamping mechanism by a fastening member 11. The base 12 includes a pair of walls 13 extended upward therefrom and includes a pair of plates 14 extended upward therefrom and located between the walls 13. A pair of studs 15 are disposed in the middle portion of the base 12 for rotatably supporting a worm 16 thereon. The worm 16 includes a knob 17 secured thereto and extended outward of the walls 13 for rotating the worm 16.

Figure 3:
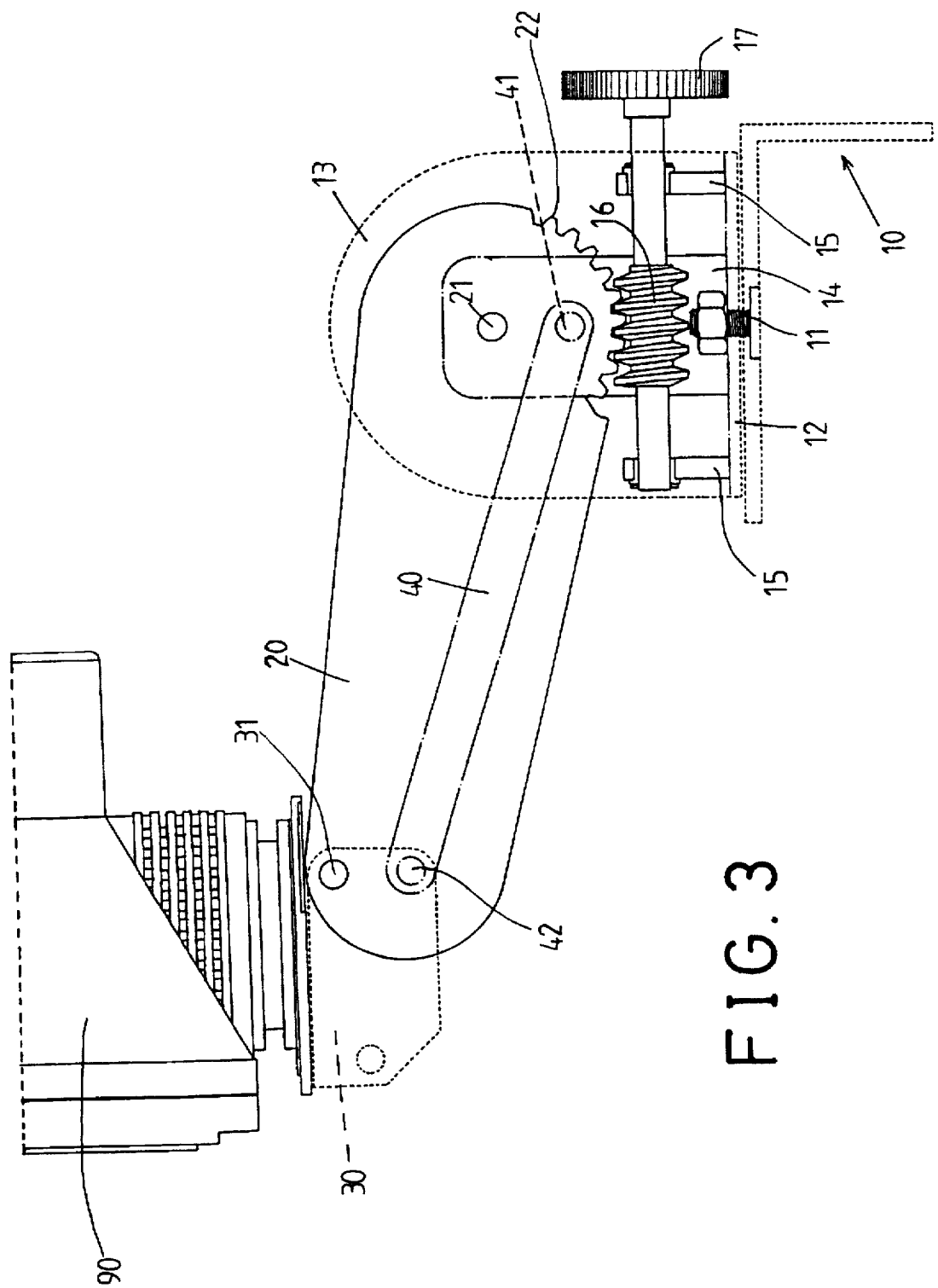

A beam 20 has a lower end pivotally coupled to the walls 13 at a pivot axle 21 and has a number of teeth 22 formed in the lower end for engaging with the worm 16 such that the beam 20 may be rotated by the worm 16 when the worm 16 is rotated by the knob 17. A bracket 30 is pivotally coupled to the other end of the beam 20 at a pivot shaft 31 for supporting a monitor 90 (FIG. 3), a printer, a book or other objects thereon. The object supported on the beam 20 may be moved up and down when the beam 20 is rotated about the pivot axle 21 by the worm 16. A lever 40 includes one end pivotally coupled to the plates 14 at a pivot pin 41 and the other end pivotally coupled to the bracket 30 at a pivot axis 42. It is preferable that a pair of levers 40 are coupled between the plates 14 and the bracket 30 so as to stably support the bracket 30 in place.

It is to be noted that the pivot pin 41 may either be secured to the plates 14 or secured to the walls 13 and is located below the pivot axle 21. The pivot pin 41 is not secured to the beam 20 such that the pivot pin 41 will not affect the rotation of the beam 20. The pivot axis 42 is located below the pivot shaft 31 so as to support the bracket 30 in a level position and so as to stably support the object on the bracket 30. The pivot axle 21, the pivot shaft 31, the pivot axis 42 and the pivot pin 41 form a parallelogram.

Referring next to FIG. 3 and again to FIG. 2, when the beam 20 is rotated about the pivot axle 21, by the worm 16, from the position as shown in FIG. 2 to that shown in FIG. 3, the pivot axle 21, the pivot shaft 31, the pivot axis 42 and the pivot pin 41 are also arranged as a parallelogram such that the pivot shaft 31 is also arranged above the pivot axis 42 and such that the bracket 30 may also be supported in the level position for stably supporting the monitor 90.

Accordingly, the support device in accordance with the present invention includes a beam 20 that may be rotated about the pivot axle 21 and includes a base 12 that may be rotated about the clamping mechanism 10 such that the monitor 90 supported on the beam 20 may be moved and adjusted to suitable positions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A support device for supporting an object thereon, said support device comprising:

a base including a pair of wall members extended upward therefrom, said wall members including a pivot axle engaged therein, a worm rotatably supported on said base, a pair of beams each including a first end pivotally coupled to said wall members at said pivot axle and each including a plurality of teeth formed on said first end thereof for engaging with said worm, said beams each including a second end for supporting the object, said beams being rotated about said pivot axle by said worm so as to move the object upward and downward, a bracket pivotally coupled to said second ends of said beams at a pivot shaft for supporting the object, and a lever including a first end pivotally coupled to said wall members at a pivot pin and including a second end pivotally coupled to said bracket at a pivot axis, said pivot pin being arranged below said pivot axle, and said pivot axis being arranged below said pivot shaft for allowing said pivot axle and said pivot shaft and said pivot axis and said pivot pin to form a parallelogram, and a clamping means, said base being engaged on said clamping means and rotatably supported on and secured to said clamping means by a fastening means, for allowing said base to rotate relative to said clamping means about said fastening means.

* * * * *